(12) United States Patent
Brown

(10) Patent No.: US 8,038,028 B2
(45) Date of Patent: Oct. 18, 2011

(54) ADDITIONAL CONTAINMENT SYSTEM FOR STORAGE TANK

(75) Inventor: Troy Alan Brown, Davie, FL (US)

(73) Assignee: General Holdings Co., Majuro (MH)

( * ) Notice: Subject to any disclaimer, the term of this patent is extended or adjusted under 35 U.S.C. 154(b) by 360 days.

(21) Appl. No.: 12/341,905

(22) Filed: Dec. 22, 2008

(65) Prior Publication Data

US 2009/0100910 A1 Apr. 23, 2009

Related U.S. Application Data

(63) Continuation of application No. 11/697,968, filed on Apr. 9, 2007, now Pat. No. 7,494,024, and a continuation-in-part of application No. 10/730,181, filed on Dec. 8, 2003, now abandoned.

(51) Int. Cl.
B65D 90/02 (2006.01)

(52) U.S. Cl. .................. 220/565; 220/567.1; 220/560.03

(58) Field of Classification Search .................. 220/4.12, 220/62.11, 62.18, 495.04, 560.03, 565, 567.1, 220/567.2, 592.27, 627, 745
See application file for complete search history.

(56) References Cited

U.S. PATENT DOCUMENTS

| | | |
|---|---|---|
| 4,408,420 A | 10/1983 | Haase |
| 4,523,454 A | 6/1985 | Sharp |
| 4,653,312 A | 3/1987 | Sharp |
| 4,696,186 A | 9/1987 | Sharp |
| 4,819,821 A | 4/1989 | Sharp |
| 4,825,687 A | 5/1989 | Sharp |
| 4,871,078 A | 10/1989 | Sharp |
| 4,875,361 A | 10/1989 | Sharp |
| 4,925,046 A | 5/1990 | Sharp |
| 5,054,645 A | 10/1991 | Sharp |
| 5,072,609 A | 12/1991 | Sharp |
| 5,096,087 A * | 3/1992 | Thomas ........................ 220/561 |
| 5,259,895 A | 11/1993 | Sharp |
| 5,314,027 A | 5/1994 | Wood |
| 5,405,036 A | 4/1995 | Haase |
| 6,171,029 B1 | 1/2001 | McGill et al. |
| 6,206,226 B1 * | 3/2001 | Coates .......................... 220/565 |
| 6,431,387 B2 * | 8/2002 | Piehler .................... 220/495.01 |
| 6,551,024 B1 * | 4/2003 | Berg et al. ....................... 405/54 |

FOREIGN PATENT DOCUMENTS

| | | |
|---|---|---|
| DE | 3816066 A1 | 11/1988 |
| WO | 8607574 A1 | 12/1986 |

* cited by examiner

*Primary Examiner* — Harry Grosso
(74) *Attorney, Agent, or Firm* — Steven M. Greenberg, Esq.; Carey, Rodriguez, Greenberg & O'Keefe

(57) ABSTRACT

An additional containment system for a fluid containment vessel includes an outer section, an inner section, and a monitoring system. A plurality of independent and distinct zones of interstitial space are positioned between the outer section and the inner section. The monitoring system is connected to and separately monitors a pressure in each of the zones. A divider plate is attached to both the inner section and the outer section and divides a first zone from a second zone. Upon detecting a leak, the monitoring system provides an indication as to the leak being in the outer section or in the inner section, and upon detecting a leak, the monitoring system also provides an indication as to which of the zones the leak is detected.

9 Claims, 8 Drawing Sheets

ADDITIONAL CONTAINMENT SYSTEM FOR STORAGE TANK

CROSS-REFERENCE TO RELATED APPLICATIONS

This application is a Continuation of U.S. application Ser. No. 11/697,968, filed Apr. 9, 2007, which is a Continuation-In-Part of U.S. application Ser. No. 10/730,181, filed on Dec. 8, 2003, both of which are incorporated herein by reference in their entirety.

BACKGROUND OF THE INVENTION

1. Field of the Invention

The disclosure relates generally to containment systems for storage tanks and, more specifically, to a containment system for providing continuous monitoring, corrosion protection, and improved leak detection of both the containment system and the storage tank.

2. Description of the Related Art

Concern for environmental pollution has resulted in additional governmental requirements to prevent certain chemicals stored in tanks from leaking into the environment. In particular, for several types of fluids, federal, state and local regulations require double containment systems for the protection, for example, of groundwater. Many commonly known methods of protecting steel tanks against corrosion have been used. For example, connecting piping of different metals can be electrically isolated to prevent the development of corrosive currents. Also, the inside and outside of the steel tank can be coated with a protective material. Additionally, cathodic protection can be employed, which uses a sacrificial anode to reverse corrosive underground current flow by placing an impressed current on the tank Many steel tanks have a layer of sand between the outer tank and the inner tank for absorption of leaks, and to support the inner tank. One technique to monitor corrosion has been to introduce a negative pressure (i.e., a partial vacuum) between the inner tank and the outer tank. However, because of the substantial distance between the inner tank and the outer tank, for example, because of the layer of sand, the vacuum effect is less than desired.

Other types of tanks employ the use of non-metallic liners. Thus, whereas the outer tank may be formed from a metal, e.g., steel, the inner tank is formed from a non-metallic material, such as fiberglass or other composite. An issue with non-metallic liners is that most non-metallic materials do not have the same toughness, compression resistance, and impact resistance as that of many metals. As a result, the non-metallic materials are more prone to cracking in certain instances. Moreover, because of the physical characteristics of the non-metallic materials used for the liner, use of a negative pressure between the outer tank and the non-metallic liner has been discouraged because the negative pressure tends exacerbate the problems associated with the non-metallic liner.

Another issue associated with current containment systems and the monitoring of leaks within these systems is the inability to narrow the potential location of a leak once a leak has been detected. For example, when a negative pressure is introduced between the inner and outer tanks, a change in the negative pressure is an indication of a leak. However, current systems cannot establish the general location within the tank where the leak exists or whether the leak is in the inner tank or the outer tank.

There is, therefore, a need for a containment system that is capable of identifying where within the storage tank a leak may exist and whether the leak exists in the inner tank or the outer tank. Also, a need exists to minimize leaks within the inner and outer tanks by reducing corrosion of the inner and outer tanks.

BRIEF SUMMARY OF THE INVENTION

Embodiments of the invention address deficiencies of the art with respect to identifying a location of a leak within a fluid containment vessel and also to reducing corrosion within the fluid containment vessel. In this regard, an additional containment system for a fluid containment vessel includes an outer section, an inner section, and a monitoring system. A plurality of independent and distinct zones of interstitial space are positioned between the outer section and the inner section. The monitoring system is connected to and separately monitors a pressure in each of the zones. A divider plate is attached to both the inner section and the outer section and divides a first zone from a second zone. Upon detecting a leak, the monitoring system provides an indication as to the leak being in the outer section or in the inner section, and upon detecting a leak, the monitoring system also provides an indication as to which of the zones the leak is detected.

In operation, a vacuum is drawn within the interstitial space to remove oxygen and moisture from the interstitial space. A non-reactive atmosphere is then introduced into the interstitial space. After introducing the non-reactive atmosphere into the interstitial space, a negative pressure is maintained within the interstitial space. The negative pressure within the interstitial space is then monitored.

In certain aspects of the containment system, the outer section includes a floor section and a vertical section, and the inner section includes distinct corner members, distinct bottom members, and a skirt. The corner members are positioned at an intersection between the floor section and the vertical section, and the corner members are L-shaped. A bottom member is attached to a corner member along a substantially horizontal surface of the corner member. The skirt is attached to a corner member along a substantially vertical surface of the corner member. In cross-section along a diameter of the vessel, the inner section is welded to the outer section at a plurality of distinct locations. The corner member is welded to a bottom member, and the skirt is welded to the corner member.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

With reference to the drawings, FIGS. 1-9 depict an additional containment system 10 for a fluid containment vessel. The vessel may be for above-ground or underground storage. The containment system 10 may also be used for piping systems or any system which stores, carries or contains liquids, gases, chemicals or any other elements to prevent these materials from escaping into the environment. Also, the system 10 may be used for refurbishments of tanks already constructed, either with or without an existing floor section. Throughout the figures, like referenced characters are used to indicate like elements.

Figure 1:
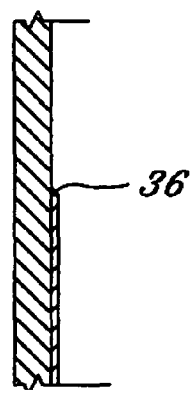
FIG. 1 is a side, cross-sectional view of an outer portion of a containment system in accordance with the inventive arrangements.
Figure 1:
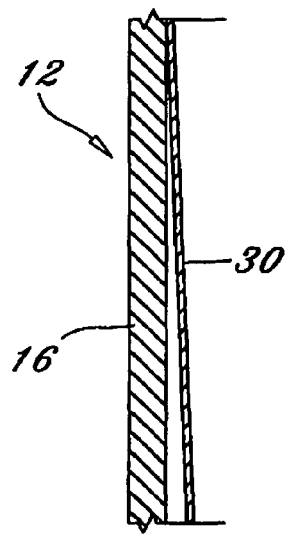
Figure 1:
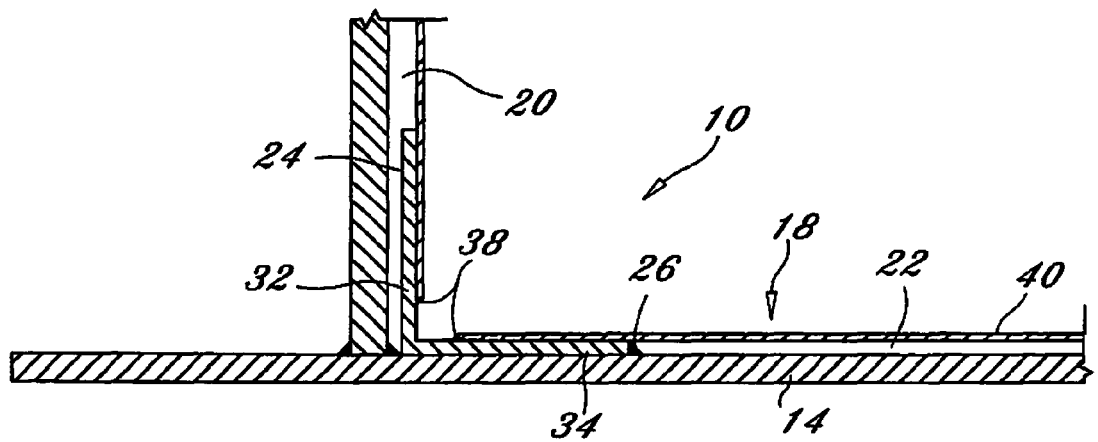

Referring to FIG. 1, the system 10 includes an outer section 12 and an inner section 18. The outer section 12 includes a floor section 14 and a generally vertical section 16. The inner section 18 interacts with the outer section 12 to form an interstitial space 20, 22 between the outer section 12 and the inner section 18. The interstitial space may include the interstitial space 20 between the vertical section 16 and the inner section, the interstitial space 22 between the floor section 14 and the inner section 18, or both interstitial spaces 20, 22. For example, in one aspect of the system 10, the components of the inner section 18 are configured to allow for communication between each of the interstitial spaces 20, 22 to form a single interconnected interstitial space. In other aspects of the system 10, one interstitial space 20 may be fluidly connected to the other interstitial space 22 using, for example, tubes, channels, or other comparable features.

According to certain aspects of the system, a partial vacuum (i.e., negative pressure) is drawn within the interstitial space 20, 22. The negative pressure in the interstitial space can serve to reduce or eliminate corrosion within the portions of the inner section 18 and the outer section 12 that borders the interstitial space 20, 22. Use of the negative pressure can also enable monitoring of any leaks into the interstitial space 20, 22. In certain aspects, the negative pressure is continually maintained within the interstitial space 20, 22, and the negative pressure is at least −5 inches of mercury. One or more sensors, such as hydrocarbon sensors, may be included within the system 10 to monitor the interstitial space 20, 22 for leakage. Sensors may also be positioned to monitor the outer section 12 to check for leakage through the outer section 12.

Figure 6:
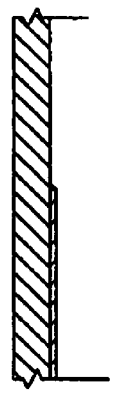
FIG. 6 is a side, cross-sectional view of another aspect of the outer portion of the containment system in accordance with the inventive arrangements.
Figure 6:
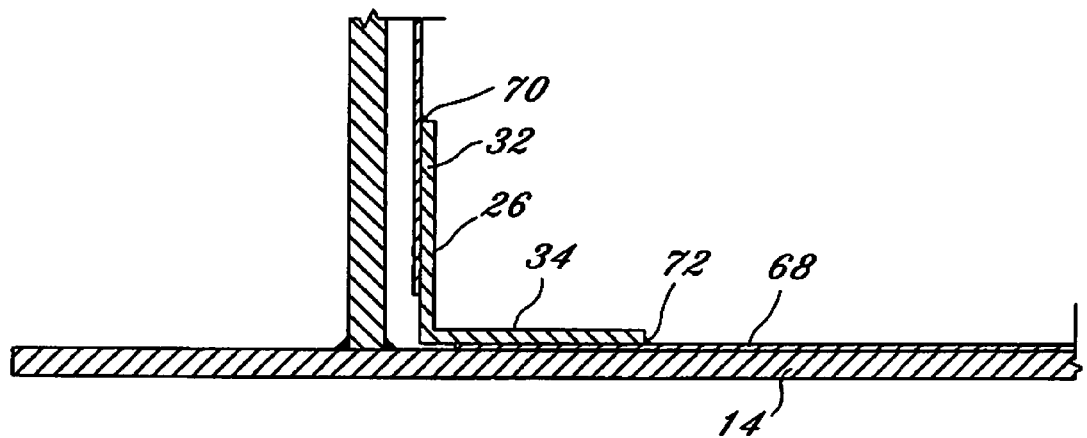
Figure 7:
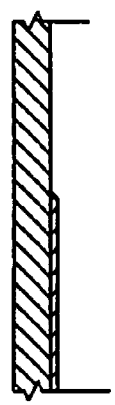
FIG. 7 is a side, cross-sectional view of yet another aspect of the outer portion of the containment system in accordance with the inventive arrangements.
Figure 7:
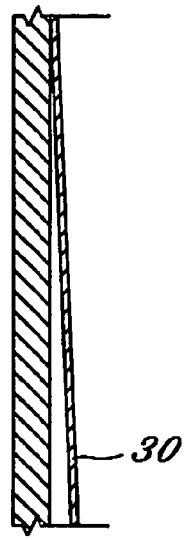
Figure 7:
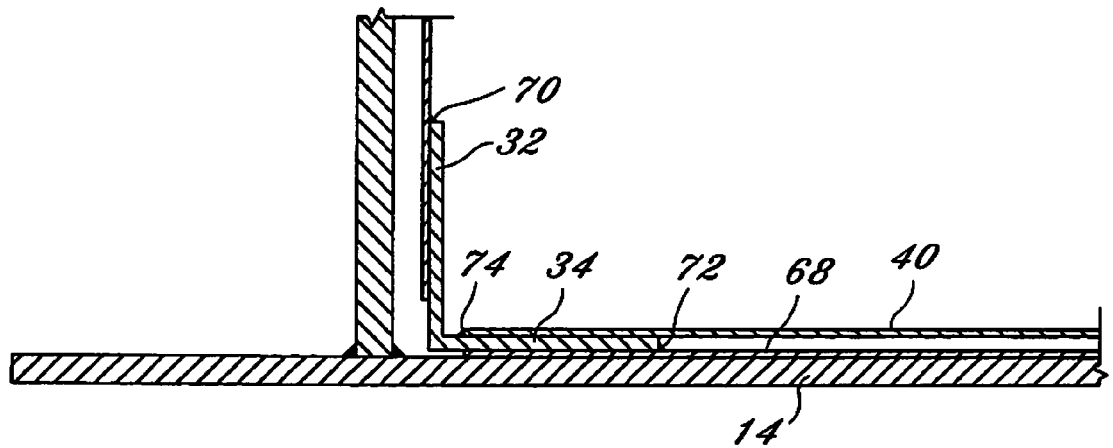

Referring to FIGS. 1, 6 and 7, the inner section 18 may include at least one corner member 24 having a first end 32 and a second end 34. With a round storage tank, for example, a series of these members 24 may be attached at the corners of the storage tank to form an interconnected circle of the corner members 24. The corner members 24 may be shaped to accommodate the geometry of the outer section 12. For example, where the floor section 14 and the vertical section 16 of the outer section 12 are substantially perpendicular, the members 24 may be L-shaped. The system 10 is not limited in the manner the corner members 24 are connected to the outer section 12. However, in certain aspects, the corner members 24 are connected to the outer section 12 via seal welds 26.

The corner member 24 may be formed from rolled steel, although other materials may be used. In certain aspects, the corner member 24 has dimensions of approximately ¼ inch by 4 inches by 4 inches. Depending upon the size of the vessel, these dimensions may vary.

Different configurations of the corner member 24 being attached to the floor section 14 are shown in FIGS. 1 and 6. In FIG. 6, the corner member 24 may be attached to both a skirt 30 of the inner section 18 and the floor section 14 of the flooring 40. Referring to FIG. 1, the corner member 24 may be attached to a bottom plate 40 of the inner section 18 by a seal weld at point 38, although other types of attachment may alternatively be employed. Referring to FIGS. 6 and 7, a seal weld may also be employed at points 70 and 72. The skirt 30 may overlap the vertical end 32 of the corner member 24, and the amount overlap with the corner member 24 may be approximately 1.5 inches.

In certain aspects of the system 10, the skirt 30 is attached to the corner member 24 at a predetermined height above a joint between the vertical end 32 and the horizontal end 34 of the corner member. For example, for a 44 foot diameter tank, the height at which the skirt 30 is attached to the corner member 24 is approximately ½ inch above the floor section 14 to reduce the likelihood of corrosion at the point of attachment.

Although not limited in this manner, the skirt 30 of the inner section 18 may be formed from a 3/16 inch steel plate. Referring to FIG. 1, in one aspect of the system 10, the skirt 30 is attached to the vertical section 16 of the outer section 12 and to the vertical end 32 of the corner member 24. At attachment point 36, the skirt 30 is attached to the vertical section 16 using, for example, a seal weld, or other type of attachment. The attachment point 36 may be above a predetermined critical height, which for a storage tank of approximate 44 feet in diameter, is at least 6 inches high.

The critical height may be based upon hoop stresses of the storage tank, which can occur with any type of vessel. Based upon the location of the hoop stresses, the attachment point 36 of the skirt 30 to the vertical section 16, as well as an attachment point of the skirt 30 to the corner member 24, are positioned to avoid these stresses. For example, the attachment points may be positioned above or below maximum stress points for a particular geometry of storage tank.

The inner section 18 includes at least one bottom plate 40. Referring to FIG. 1, the bottom plate 40 overlaps the horizontal end 34 of the corner member 24. Alternatively, as illustrated in FIG. 6, the bottom plate or plates 40 may be positioned below the corner member 26. As illustrated in FIGS. 1, 6 and 7, the skirt 30 and the bottom plate 40 are attached to the corner member 26 using a seal weld 38 or other type of attachment. To form the inner section 18, a plurality of L-shaped corner members 26 and skirts 30 may be positioned around an inside perimeter of the outer section 12.

Figure 2:
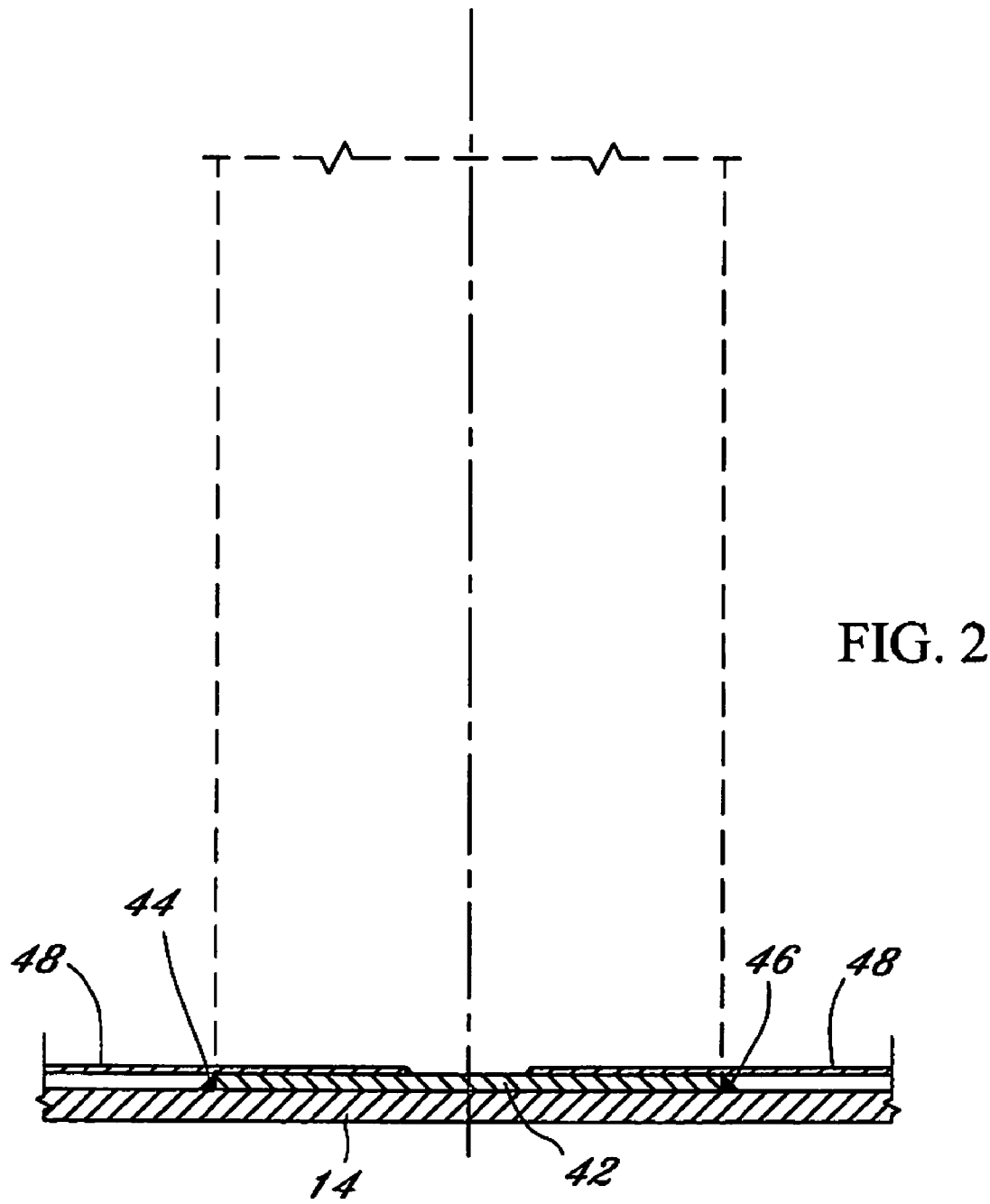
FIG. 2 is a side, cross-sectional view of an inner portion of the containment system in accordance with the inventive arrangements.
Figure 3A:
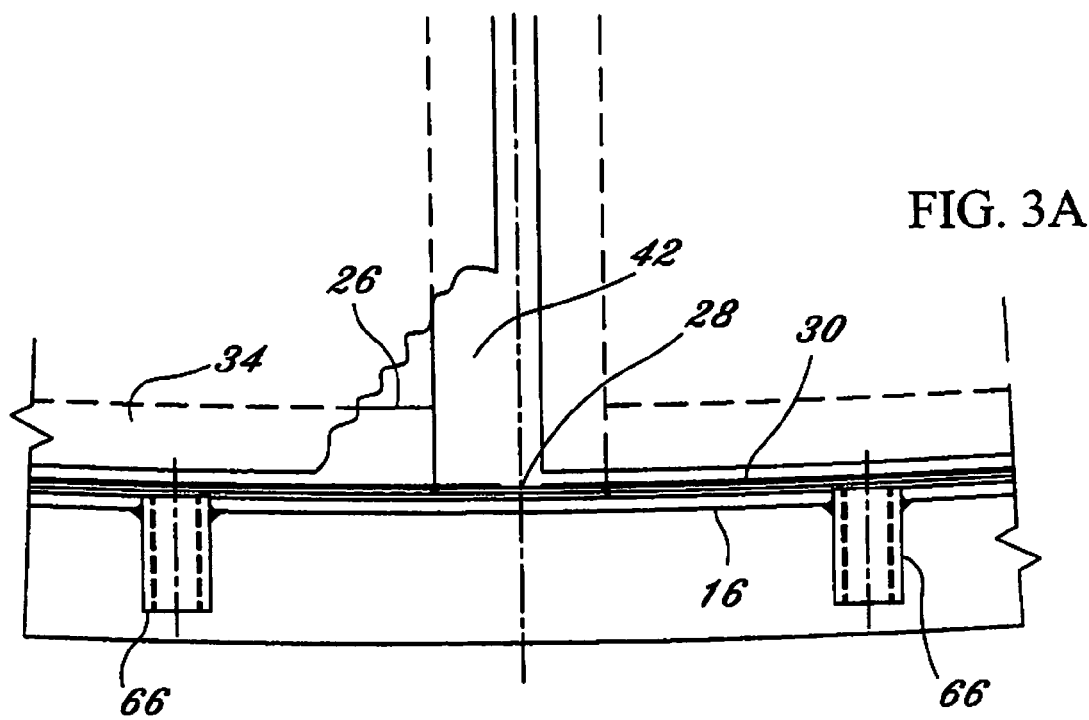
FIG. 3A is a partial plan view of a dividing plate of the containment system in accordance with the inventive arrangements.
Figure 3B:
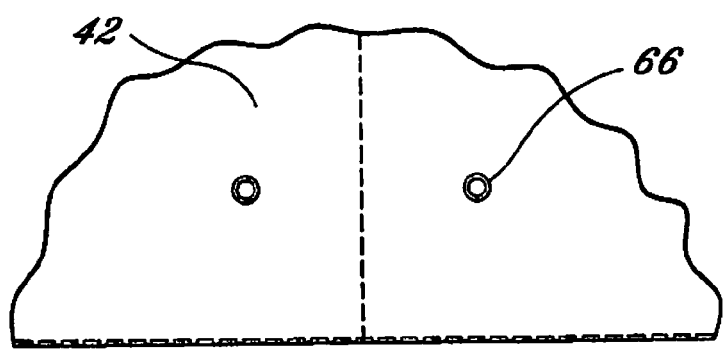
FIG. 3B is a partial side view of the containment system in accordance with the inventive arrangements.
Figure 5:
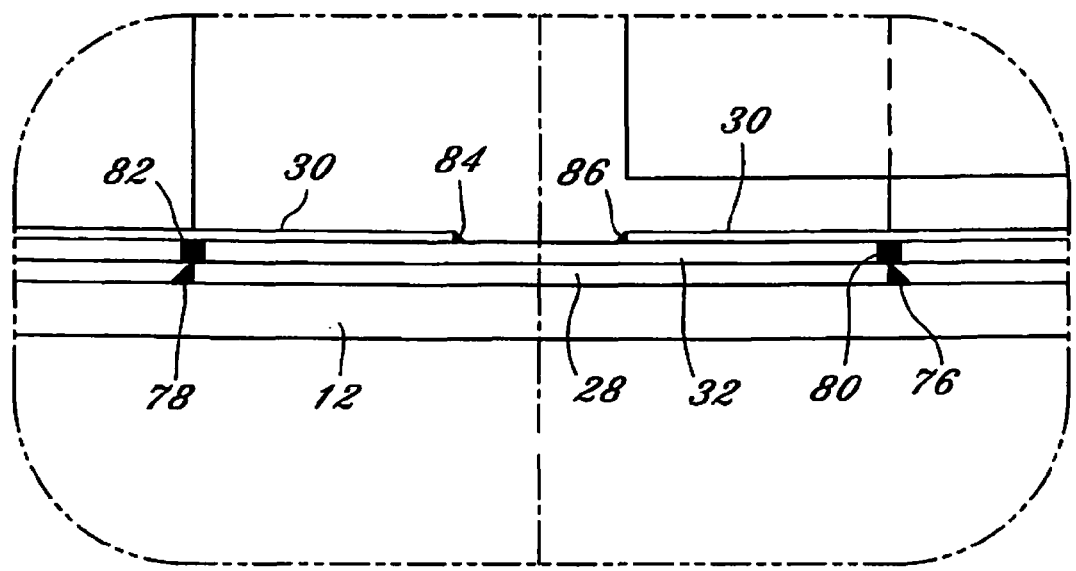
FIG. 5 is a side, cross-sectional view of the welding details for the dividing plate in accordance with the inventive arrangements.

Referring to FIGS. 2, 3, and 5, in certain aspects of the system, the interstitial space 20, 22 is divided by divider plates 42 to create two or more separate and distinct zones. The divider plates 42 may have a parallel orientation, a perpendicular orientation or other types of orientation to provide the separate the interstitial space 20, 22 into the two or more zones. By having two or more zones of interstitial spaces 20, 22, the system 10, upon a leak being detected, enables the location of the leak to be narrowed down to a particular zone. In so doing, the exact location of the leak can be determined much more quickly, which reduces the amount of materials and labor, and decreases the amount of time the storage tank is unusable.

In certain aspects of the system 10, one side of the divider plate 42 is gas permeably attached to the floor section 14 and the other side of the divider plate 42 is impermeably attached to the floor section 14. Referring to FIG. 2, although not limited in this manner, a stitch weld may be used to permeably attach the divider plate 42 to the floor section 14 at location 44, and a seal weld may be used to impermeably attach the divider plate 42 to the floor section at location 46. New floor plates 48, which are comprised of bottom plates 40, may overlay an original flooring 14 of the storage tank and sealingly attached, so that the system 10 includes two independently sealed interstitial space sections divided by the divider plate 42. In certain aspects, the divider plate 42 is ¼ inch by 4 inches by 44 feet for a storage tank of approximately 44 feet in diameter. However, varying widths may be used depending upon the diameter of the storage tank.

Referring to FIG. 3, monitoring ports/vacuum couplings 66 may be positioned within an outer portion of each divided zone. Each monitoring port 66 is provides a fluid connection to the interstitial space 20, 22 between the outer portion 12 and the inner portion 18 of the system 10. Although not limited in this manner, sensors may be positioned with the ports 66 to monitor leakage with the interstitial space 20, 22. One or more additional monitoring ports, or sensors alone, may be located under the floor section 14 to monitor leakage under the entire system 10. The seals between the various components of the system 10, such as seal welds, can provide sufficient strength to allow a high negative pressure in the interstitial spaces 20, 22 to increase the responsiveness of the sensors. Furthermore, the high negative pressure provides an environment within the system 10 which is resistant to corrosion. In certain aspects, the monitoring ports 66 are centered around a centerline of a rolled up end of the divider plate 42.

In certain aspects, the portions of the divider plate(s) 42 positioned adjacent the vertical section 16 are rolled up 90 degrees at the ends. In so doing, the divider plate(s) 42 have two vertical portions 28 at each end. Referring to FIG. 3, the rolled up end 28 of the divider plate 42 may be seal welded to the vertical section 16 of the outer section 12. Other manners of attaching the vertical portions 28 to the vertical section, however, may be employed, such as through the use of a composite such as fiberglass and epoxy.

Referring to FIG. 5, a welding plan at each vertical end 28 of the divider plate 42 is illustrated. The divider plate 42 may be seal welded to the vertical section 16 of the outer section 12 at 76, 78. The vertical end 32 of the corner member 26 may be seal welded on each side 80, 82. Steel skirts 30 may be seal welded to the vertical end 32 of the member 28 at 84, 86. Other equivalent attachment are also contemplated. Although not shown in FIG. 5, the skirt 30 may overlap the corner member 24 at this location.

Referring to FIG. 6, the system 10 may be deployed in a pre-existing storage tank as follows. The divider plate(s) 42 are laid on the floor section 14, and at the outer periphery of the floor section 14 adjacent the vertical section 16 of the outer section 12, and divider plates(s) 42 with the rolled up ends attached to the vertical section 16. In so doing, the divider plates define the separate and distinct zones. The corner members 26 are positioned around the inner circumference of the outer portion 12 and attached to the bottom surface 14, and where the corner members 26 intersect the divider plates 42, the corner members 26 may overlay the divider plates. The bottom plates 40 are then placed to cover the floor section 14 and may overlay both the divider plate(s) 42 and the horizontal section 34 of the corner members 26.

In this aspect, the need for an upside-down weld between the vertical end 32 of the member 26 and the skirt 30 is eliminated, which can make the installation easier. However, the upside-down weld may be needed for the aspects illustrated in FIGS. 1 and 7. This may also be advantageous in circumstances using a new flooring 68, in which bottom plates 40 are overlaid the original floor section 14, as shown in FIG. 7. In this aspect, a first flooring layer is overlaid the bottom surface 16, and bottom plates 40 are attached to the top surface 34 of the corner member 26 to form a second flooring layer.

Referring to FIG. 2, in certain aspects of the system, bottom plates 48 over the divider plate 42 do not overlap one another. The skirt 30 is then attached to the vertical section 12 of the corner members 26. As can be readily envisaged, alternative orders of placing the various elements may be employed without changing a final configuration of the system 10.

For example, referring to FIG. 1, the corner member 24 is attached to the bottom surface 14. The divider plate 42, if used, is then attached to adjacent corner members 24. The bottom plates 40 are then overlaid over the corner members 24 and the divider plate 42. The skirt 30 may then attached to the corner members 24.

In certain aspects of the system 10, the bottom plates 40 are formed from approximately 3/16 inch thick steel plates. The vertical end 32 of the corner member 26 may be seal welded to the skirt 30, and the horizontal end 34 may be seal welded to the new flooring 68 at points 70 and 72. Several divider plates 42 may be used in the system 10.

Referring to FIG. 2, bottom plates 48 are attached to the divider plate 42 located on the floor section 14 of the outer section 12. Although not limited in this manner, the bottom plates may overlap the divider plate 42, and in certain aspects of the system, the bottom plates 48 overlap the divider plate 42 by approximately 1.5 inches. The bottom plates 48 may also be positioned relative to the divider plate 42 in a staggered configuration. In so doing, any welds used to connect the bottom plates 48 to the divider plates 42 are not aligned along a straight line. Although not limited in this manner, overlapping plates may be connected via seal welds. A similar configuration is illustrated in FIG. 7, in which bottom plates 40 overlapping the horizontal end of the L-shaped member 26 may be connected to the L-shaped member 26 via a seal weld.

Figure 4:
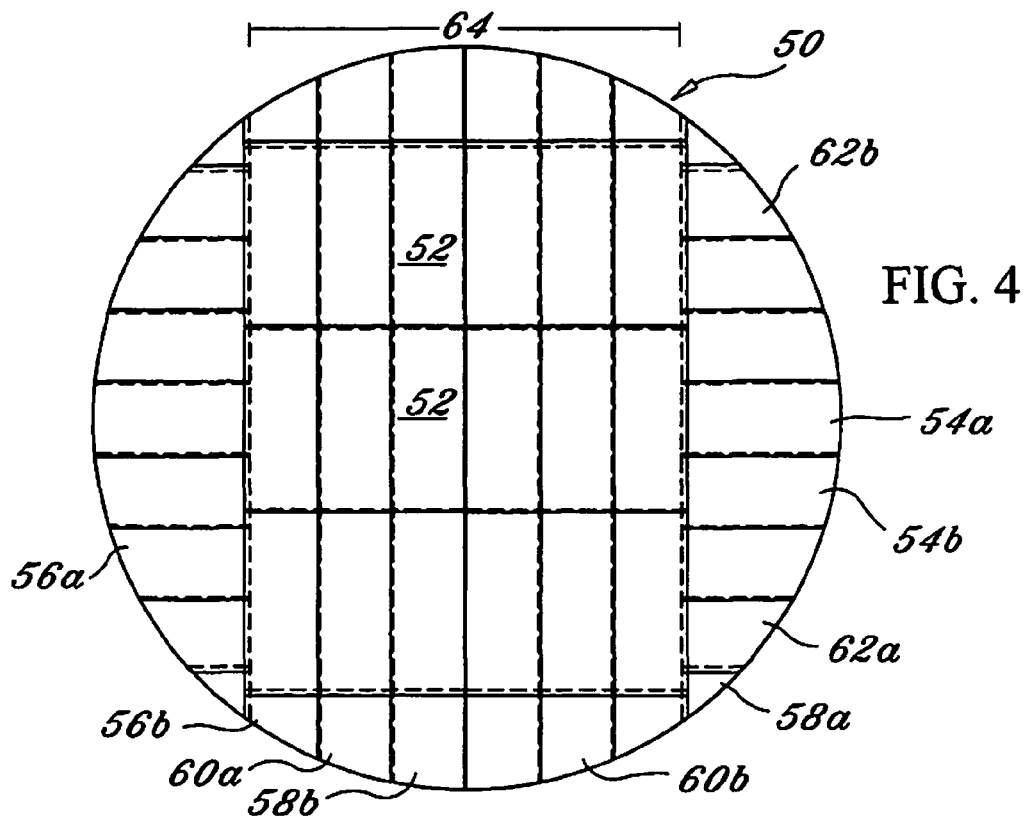
FIG. 4 is a plan view of a layout of bottom plates used to form a floor section of an inner section of the containment system in accordance with the inventive arrangements.

Referring to FIG. 4, in an alternative aspect, bottom plates 52 of the inner section 18 may be configured over the floor section 14 of the outer section 12 in an ordered array 50. As illustrated, uncut bottom plates 52 may be placed toward the center of the system 10, and cut bottom plates 54a, 54b may shaped to fit a perimeter of the array 50 and placed around the uncut bottom plates 52. The cut bottom plates at the perimeter of the array 50 may have an overlap with adjacent plates of approximately 3.5 inches.

In certain aspects, a single bottom plate may be cut to provide two differently shaped pieces, such as the bottom plates marked 56*a*, 56*b* and 58*a*, 58*b*. In addition, two similarly shaped plates may be formed from a single bottom plate, such as the bottom plates marked 60*a*, 60*b* and 62*a*, 62*b*. Having the same cut made twice on the same bottom plate to make shaped bottom plates can reduce both manufacturing time and cost. Also, having standard cuts made from a standard sized plate, such as the uncut bottom plate 52, can further reduce manufacturing time and cost. The system, however, is not limited as other combinations of cuts of bottom plates to form the desired array 50 may be used.

Figure 8:
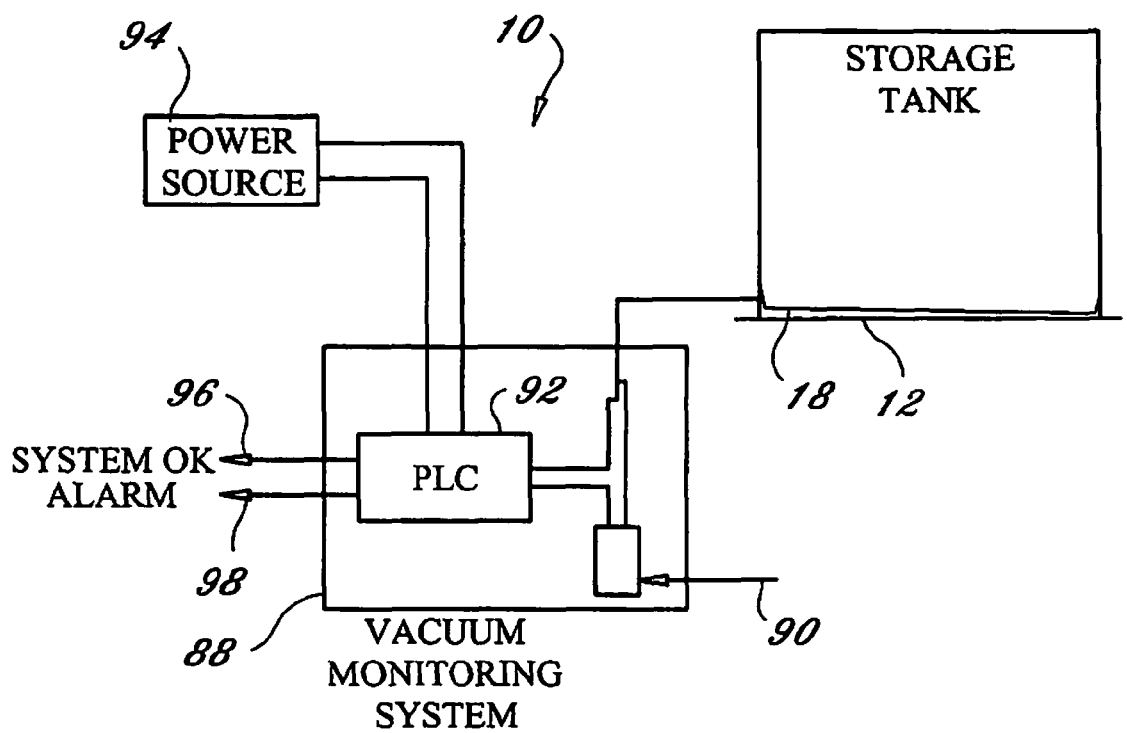
FIG. 8 a schematic view of a vacuum monitoring system of the containment system in accordance with the inventive arrangements.

FIG. 8 is a schematic diagram of the system 10 including a vacuum monitoring system 88. In certain aspects of the system 10, the storage tank includes an interstitial space between the inner section 18 and the outer section 12. A vacuum pump 90 maintains a vacuum within the interstitial space. The vacuum monitoring system 88 may be controlled by a programmable logic controller (PLC) 92, and the controller 92 may be in communication with a power source 94. In certain aspects of the vacuum monitoring system 88, the power source 94 uses approximately 12 volts alternating current, which is converted to 24 volts of direct current, to be compliant with National Electrical Code requirements. However, the vacuum monitoring system 88 is not limited in this manner, and other devices capable of powering the pump 90 may be used. The controller 92 monitors the level of vacuum in the interstitial space, and provides an output, which may indicate that (i) the system 10 is functioning properly 96, or (ii) a leak has occurred 98.

In certain aspects of the system, a constant vacuum of at least 5 inches of Hg is maintained in the interstitial space. If a leak/opening within the inner/outer sections 18, 12 develops, the vacuum in the interstitial space drops (i.e., the pressure increases). As the vacuum begins to drop, the vacuum pump will start and attempt to bring the vacuum back to a set pressure. It is recognize that some fluctuation in pressure is normal based upon, for example, such as changing atmospheric conditions. However, in the certain aspects of the vacuum monitoring system, the controller 92 triggers an alarm after a predetermined event. Although not limited in this manner, the predetermined event may be occur when the pump 90 has been triggered more often than a predetermined amount over a predetermined amount time, the pump 90 cannot bring the pressure to a predetermined value after a predetermined amount of time, or other conditions according to the preference of the user. In certain aspects, the vacuum pump may be reset with a reset button.

Figure 9:
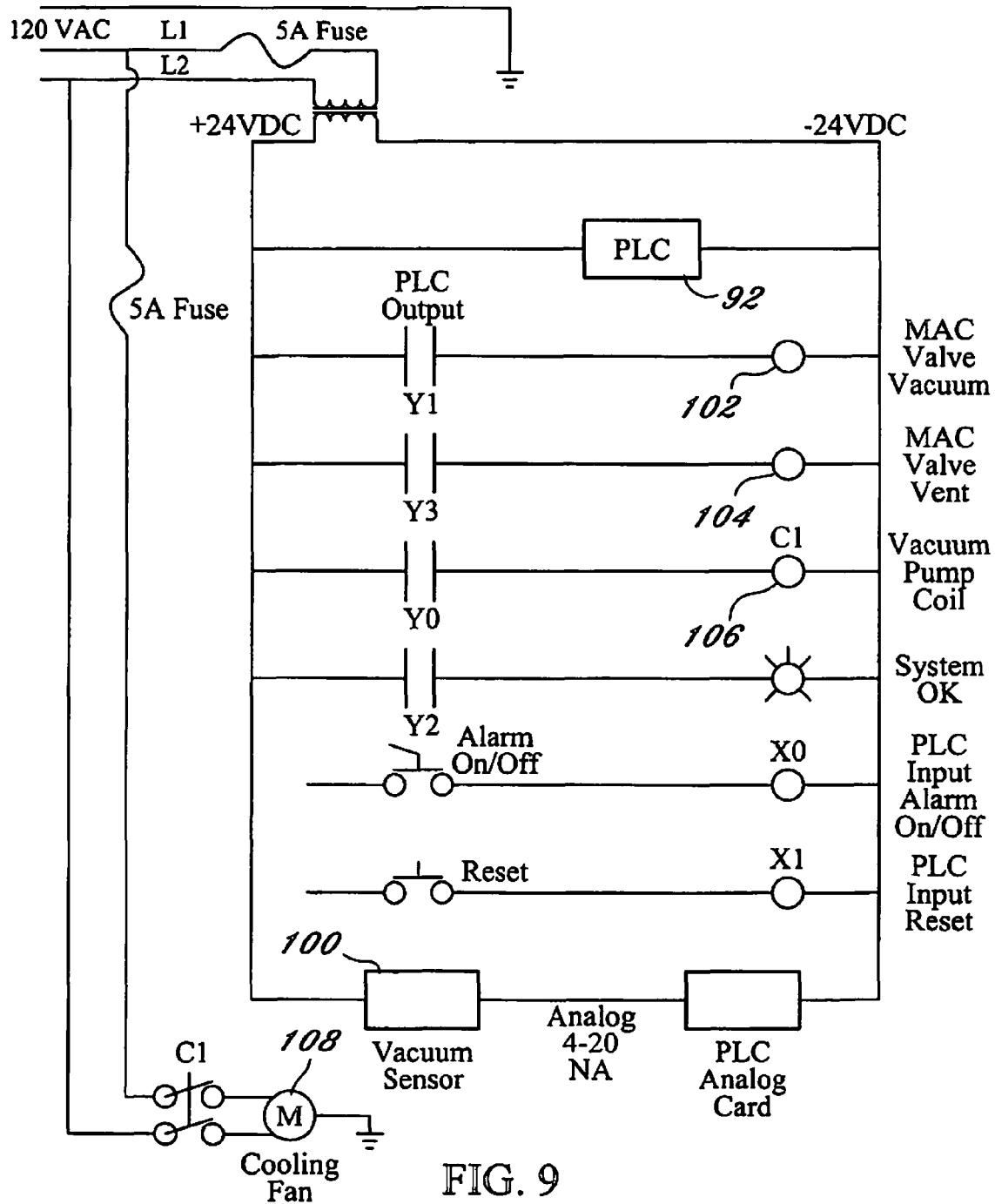
FIG. 9 is a schematic view of a leak detection system of the containment system in accordance with the inventive arrangements.

FIG. 9 is a schematic diagram of a vacuum leak detection system. The leak detection system may include a vacuum sensor 100 and a vacuum pump 102, and the vacuum may include a vent 104 and a vacuum pump coil 106, which are in communication with the controller 92. A cooling fan 108 may be used to cool the vacuum leak detection system and to prevent the detection system from overheating.

In certain aspects of the vacuum leak detection system, a pressure transducer sends a 4-20 ma signal to the controller 92. Also, the vacuum pump 102 is sized to pump at least 10 cubic inches per minute. If the vacuum pump 102 is incapable of reducing the pressure to a predetermined operational level in a desired amount of time, a larger vacuum pump may be employed. In certain aspects of the vacuum leak detection system, the detection system is shut off only by disconnecting a power source to the vacuum leak detection system. FIG. 9 includes typical operating values for certain of the electronic components illustrated. These operating values, however, as is known in the art, may vary, other operating values may be employed. Additionally, the present vacuum leak detection system is not limited to the particular electronics and/or architecture illustrated in FIG. 9.

After installation, a high level vacuum may drawn in the interstitial space and held for an extended amount of time during which the vacuum level may be monitored for changes. Vacuum loss sources (i.e., leaks/holes within the inner section 18 or the outer section 12) are sought and eliminated upon being found. Upon satisfactory testing of the system, moisture and oxygen within the interstitial space is removed, for example using a vacuum. Moreover, a non-reactive partial atmosphere including, for example, one or more inert gasses, such as nitrogen, may be introduced into the interstitial space between the inner section 18 and the outer section 12. The non-reactive atmosphere may reduce the potential for corrosion within the inner section 18 and the outer section 12, thereby extending the life of the system.

After fluid is introduced into the storage tank and upon detection of a leak with the, a determination may be made, depending upon a resultant vacuum level, as to whether the leak is within the inner section 18 or the outer section 12. A leak in the inner section 18 would be exposed to the fluid within the storage tank, which depending up the amount of fluid within the storage tank, has a pressure, at the site of the leak, that may be considerably greater than ambient (e.g., atmospheric) pressure. In contrast, a leak in the outer section 18 would be exposed to atmospheric pressure. Thus, according to the present invention, a determination can be made as to whether a leak is within the inner section 18 or the outer section 12 depending up the measured vacuum level within the interstitial space.

In certain aspects of the containment system, a flushing system may be included to flush out the interstitial space with an agent, such as a detergent, after a leak has been detected. The flushing may automatically occur after a leak has been detected by one or more sensors. Alternatively, interaction by a user may be required to deploy the flushing system. Moreover, a separate flushing system may be provided for each of the independently-isolated sections. By providing a flushing system, a send pad, which is typically employed in current systems and is generally found under the storage tank, may not be needed.

What is claimed is:

1. An additional containment system for a fluid containment vessel, comprising:
   an outer section including a floor section and a vertical section; and
   an inner section including distinct L-shaped corner members and distinct bottom members and a skirt that is attached to the vertical section, wherein
   the corner members are positioned at an intersection between the floor section and the vertical section, and
   at least one interstitial space is positioned between the outer section and the inner section.

2. The system of claim 1, wherein a bottom member is attached to a corner member along a substantially horizontal surface of the corner member.

3. The system of claim 1, wherein the skirt is attached to a corner member along a substantially vertical surface of the corner member.

4. An additional containment system for a fluid containment vessel, comprising:
   an outer section including a floor section; and
   an inner section, wherein
   in cross-section along a diameter of the vessel, the inner section is welded to the outer section at a plurality of distinct locations, at least one interstitial space is positioned between the outer section and the inner section; and, a divider plate attached to both the inner section and the outer section and dividing a first zone of independent and distinct interstitial space from a second zone of independent and distinct interstitial space.

5. The system of claim 4, wherein the inner section includes distinct corner members and distinct bottom members, wherein the corner members are positioned at an intersection between the floor section and a vertical section of the outer section.

6. The system of claim 5, wherein a corner member is welded to a bottom member.

7. The system of claim 5, wherein the corner members are L-shaped.

8. The system of claim 5, wherein the inner section further includes a skirt that is attached to a vertical section of the outer section.

9. The system of claim 8, wherein the skirt is welded to the corner member.

* * * * *